(12) United States Patent
Chen et al.

(10) Patent No.: US 7,061,379 B2
(45) Date of Patent: Jun. 13, 2006

(54) RFID SYSTEM AND METHOD FOR ENSURING SAFETY OF HAZARDOUS OR DANGEROUS SUBSTANCES

(75) Inventors: Fung-Jou Chen, Appleton, WI (US); Walter C. Reade, Appleton, WI (US); Jeffrey Dean Lindsay, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 509 days.

(21) Appl. No.: 10/301,846

(22) Filed: Nov. 21, 2002

(65) Prior Publication Data

US 2004/0100383 A1 May 27, 2004

(51) Int. Cl.
*G08B 13/14* (2006.01)

(52) U.S. Cl. .................. 340/572.1; 340/5.12; 235/375; 235/376; 235/383; 700/215

(58) Field of Classification Search ................ 340/5.92, 340/572.1; 235/375, 376, 383, 385; 700/215, 700/221, 224, 226
See application file for complete search history.

(56) References Cited

U.S. PATENT DOCUMENTS

| | | | |
|---|---|---|---|
| 5,361,070 A | 11/1994 | McEwan | |
| 5,677,927 A | 10/1997 | Fullerton et al. | |
| 5,687,169 A | 11/1997 | Fullerton | |
| 5,726,884 A * | 3/1998 | Sturgeon et al. | 705/9 |
| 5,832,035 A | 11/1998 | Fullerton | |
| 5,955,969 A | 9/1999 | D'Hont | |
| 6,037,879 A | 3/2000 | Tuttle | |
| 6,177,903 B1 | 1/2001 | Fullerton et al. | |
| 6,195,006 B1 * | 2/2001 | Bowers et al. | 340/572.1 |
| 6,218,979 B1 | 4/2001 | Barnes et al. | |

(Continued)

FOREIGN PATENT DOCUMENTS

| | | |
|---|---|---|
| DE | 29714999 | 11/1997 |
| DE | 19742126 | 3/1999 |
| WO | 0215073 | 2/2002 |
| WO | 02080060 | 10/2002 |

OTHER PUBLICATIONS

Advertisement—www.mobilecloak.com—mCloak—RFID Tolltags etc., Copyrighted—2002.

(Continued)

*Primary Examiner*—Jeffery Hofsass
*Assistant Examiner*—Samuel J. Walk
(74) *Attorney, Agent, or Firm*—Dority & Manning

(57) ABSTRACT

A RFID method for storing products in a defined location is provided to minimize undesired combinations of stored products resulting from improper placement of the products in the storage location. RFID smart tags are associated with any products to be stored within the storage location, the smart tags containing information to identify the product they are associated with. A product profile is compiled and stored for any products to be stored within the storage location, the profile may include information on products, materials, and substances that should not be stored together or in close proximity to the profiled product. A smart tag scanner is disposed at a position relative to the storage location such that the scanner is within range of any smart tag associated with a stored product at any position within the storage location, the smart tag scanner configured to retrieve the product identification information from the smart tags. For the products identified by the scanner, the respective product profiles are use to determine if any of the identified products are improperly stored relative to any other identified product.

23 Claims, 4 Drawing Sheets

U.S. PATENT DOCUMENTS

| | | | |
|---|---|---|---|
| 6,226,619 B1 | 5/2001 | Halperin et al. | |
| 6,429,768 B1 | 8/2002 | Flick | |
| 6,446,049 B1 | 9/2002 | Janning et al. | |
| 6,491,217 B1 | 12/2002 | Catan | |
| 6,693,511 B1 | 2/2004 | Seal | |
| 6,693,539 B1 | 2/2004 | Bowers et al. | |
| 2002/0070862 A1 * | 6/2002 | Francis et al. | 340/572.1 |

OTHER PUBLICATIONS

Advertisement—www.mobilecloak.com—RFID Tags, Copyrighted—2002.

Ultra–Wideband Technology for Short—or Medium–Range Wireless Communications, Copyrighted—2001 Intel Corporation.

Ultra Wideband: The Ultimate Disruptive Technology, www.ultrawidebandplanet.com—Jun. 11, 2002 Int Media Group.

U.S. Approves Ultra–Wideband Technology, www.wirelessnewsfactor.com—Feb. 15, 2002.

New Public Safety Applications and Broadband Internet Access Among Uses Envisioned by FCC Authorization of Ultra–Wideband Technology, Federal Communications Commission—Feb. 14, 2002.

Ultra Wideband—Searchnetworking.com, Copyrighted 2000-2002—Techtarget.

Internet Article—www.timedomain.com –PulsON Technology Capabilities, Sep. 3, 2002.

White Paper—Integration of Auto–ID Tagging System with Holonic Manufacturing Systems—Cambridge University Auto–ID Center, Published Sep. 1, 2001.

Auburn University—Detection & Food Safety Center—audfs.eng.auburn.edu, Sep. 4, 2002.

Internet Article—Smart Tags Indicate Freshness—Courses.che.umn.edu, Sep. 4, 2002.

Internet Article—www.aimglobal.org—Pharmaceutical Distributor Cuts Day of Safety Stock, Aug. 29, 2002.

Internet Article www.idtechex.com—Independent Market, Strategic and Technology Reports, Aug. 29, 2002.

Internet Article—www.readymealsinfo.com—M&S Pilots RFID System for Fresh Food Operation, Sep. 4, 2002.

Internet Article—audfs.eng.auburn.edu—Auburn University Detection & Food Safety Center, Sep. 4, 2002.

RFID Journal—Internet Article—www.rfidjournal.com—Auto–ID Center Opens Demonstration Lab in the U.K. Sep. 4, 2002.

Internet Article—www.autoidcenter.org—Transmitting ePC Codes, Aug. 26, 2002.

Internet Article—www.electronicidinc.com—Destron–Fearing Electronic ID Background, Sep. 4, 2002.

Internet Article—Destronfearing.com—Applications–Companion Animals, Sep. 4, 2002.

Internet Article—audfs.eng.auburn.edu—Auburn University—Detection & Food Safety Center, Sep. 4, 2002.

Internet Article—SFGate.com—Shops Try Chips for Tracking Every Move by Client 'Tribe' Monitoring Systems Note What Catches Customers' Eyes, Aug. 6, 2002.

Internet Article—www.aimglobal.org—Radio Frequency Identification—RFID A Basic Primer, Sep. 28, 1999.

Internet Article—www.aimglobal.org—Common Applications—RFID, Jul. 23, 2002.

Internet Article—www.usatoday.com—New Chips Could Make Everyday Items 'Talk', Jul. 23, 2002.

Forbes Magazine—The Internt of Things, Mar. 18, 2002.

Auto–ID Center—Institute for Manufacturing, University of Cambridge—White Paper—Auto–ID Based Control—An Overview, Feb. 1, 2002.

Wireless Handhelds—Beam Up Some Information, Scotty, Control Engineering, May, 2002.

Scientific American—Wireless Data Blaster, May, 2002.

Auto–ID Center, Institute for Manufacturing, University of Cambridge, White Paper—The Intelligent Product Driven Supply Chain, Feb. 1, 2002.

Auto–ID Center Massachusetts Institute of Technology—White Paper—Smart Medicine—The Application of Auto–ID Technology to Healthcare, Feb. 1, 2002.

U.S. application Ser. No. 10/301,513, filed Nov. 21, 2002.
U.S. application Ser. No. 10/301,879, filed Nov. 21, 2002.
U.S. application Ser. No. 10/301,882, filed Nov. 21, 2002.
U.S. application Ser. No. 10/301,877, filed Nov. 21, 2002.
U.S. application Ser. No. 10/301,883, filed Nov. 21, 2002.
U.S. application Ser. No. 10/301,549, filed Nov. 21, 2002.
U.S. patent application Publication No. 2002/0070862, Jun. 13, 2002.

* cited by examiner

US 7,061,379 B2

RFID SYSTEM AND METHOD FOR ENSURING SAFETY OF HAZARDOUS OR DANGEROUS SUBSTANCES

TECHNICAL FIELD OF THE INVENTION

The present invention relates generally to the field of storage of hazardous or dangerous substances, and more particularly to a system and method for ensuring that such substances are not stored in dangerous combinations.

BACKGROUND

Radio Frequency Identification Devices (RFIDs) are low-cost, passive "smart" chips or "tags" that can be embedded in or attached to articles, products, and the like, to convey information about the product via a scanner. The smart tags are generally small label-like devices with a micro-chip and a miniature embedded antennae. The tags may be passive or active, the active tags requiring an internal power supply. A reader or scanner interrogates the smart tag with an electronic "trigger" signal. The tag in turn generates an electromagnetic pulse response that is readable by the scanner, the response containing the product information. RFID smart tags can be embedded in or attached to product packaging, or incorporated directly into the product, and may convey conventional "bar code" information, as well as other more detailed information.

Various commercial applications have been suggested for smart tags, particularly in the area of retail marketing and sales. For example, RFID technology may be used to gather information related to consumer trends, purchasing habits, consumption rates, etc. It has also been suggested that RFID technology has promise in the areas of inventory control, manufacturing process and control, product accountability and tracking systems, etc. Manufacturers, shippers, and retailers may be able to follow a given product through their respective systems from initial production through to point of sale. It has been suggested that other applications may include shopping carts that automatically charge a bank account, refrigerators that tap into the Internet to automatically reorder items that are running low, and interactive televisions linked to such refrigerators that will feed targeted commercials and special offers to consumers. (See, "They Know What You Eat," by Kayte VanScoy, Smart Business, January 2001).

The present invention relates to a novel implementation of RFID technology for ensuring that substances are not stored in potentially dangerous or hazardous combinations.

The storage of hazardous, toxic, or dangerous chemicals, biological samples, explosive substances, and the like, often involves ensuring that such materials are stored separately and away from certain other materials, or are not inadvertently mixed in dangerous combinations. For example, certain chemicals are fairly stable and non-reactive in their base state, but may become highly volatile and reactive in the presence of another chemical, even minute amounts of such chemical. Certain combinations of chemicals are toxic, corrosive, explosive, etc., and care must be taken that dangerous combinations of chemicals are not inadvertently created in storage of the chemicals. Similarly, in medical or laboratory facilities, it is important that potentially infectious or otherwise dangerous biological samples be stored separately from food products or other consumable goods. Various other scenarios exist wherein it is important to separately store different classes or types of materials.

Despite precautions taken with conventional storage methods and systems, the possibility of materials or dangerous substances being inadvertently combined or stored in hazardous proximity to other substances is still fairly high. Present precautionary measures and accountability methods largely rely on human controls and vigilance and, despite the best of efforts and intentions, mistakes can be made.

The present invention provides a RFID system and methodology for minimizing the likelihood that chemicals and other materials are inadvertently stored or combined in a potentially hazardous or dangerous manner.

SUMMARY

Objects and advantages of the invention will be set forth in the following description, or may be obvious from the description, or may be learned through practice of the invention.

A method is provided to improve the system and process of storing products in defined locations so as to minimize undesired or potentially dangerous combinations of the stored products. In general terms, the method takes advantage of RFID technology to ensure that products are not improperly or inadvertently stored in close proximity to other products or substances, or combined with other products and substances, so as to result in a potentially dangerous situation.

It should be appreciated that the present invention is not limited to any particular type of product stored, or any particular type of storage location. For example, the methodology has application for storage of chemical substances wherein it is important that certain chemicals are not stored in close proximity to others, or that certain chemicals are not inadvertently mixed with others. Thus, the methodology may be practiced in any industrial, medical, research, etc., facility wherein such substances are stored. Likewise, the present methodology has application to prevent the inadvertent or improper storage of potentially infectious or contagious biological samples, for instance in a research facility, medical facility, and the like. The methodology will have use wherever volatile substances are stored, particularly to ensure that substances or materials that become volatile in the presence of other particular types of materials are not inadvertently stored next to each other or inadvertently combined. It will be apparent to those skilled in the art that the methodology according to the present invention has widespread application.

An embodiment of the method includes providing a storage location for the products having storage positions therein. The storage location may be, for example, a locker, storage room, refrigeration unit, etc. Any structure or space wherein products are stored for a period of time may be considered within the scope of the storage location. RFID smart tags are "associated" with any products that are to be stored within the location. The RFID tags may be, for example, attached directly to the containers in which the products are stored, nonremovably imbedded in the containers, attached to the packaging of the products, etc. It is desirable that the smart tags be securely "associated" with the products so as not to become inadvertently removed from their respective products. The smart tags contain information relating to the product they are associated with. For example, this information desirably at least identifies the particular product. The information may also include the generic type of product, constituent components of the product, and generally any information that may be useful for considerations of long term storage of the product.

A product profile is compiled and maintained for all of the products that are stored and that may be stored within the storage location. This product profile includes information related to products, materials, and substances that should not be stored together or in close proximity to the profiled product. These product profiles are, for example, maintained in a conventional electronic storage means, for example the storage of and associated computer system.

At least one smart tag scanner is disposed at a position relative to the storage location such that the scanner is within range of all of the storage positions within the location. In this way, any product stored in any position having a smart tag associated therewith will be within range of the scanner. The smart tag scanner is configured to retrieve the product identification information from the smart tags relating to their associated products. A smart tag scanner may be disposed at any convenient location relative to the storage location.

The method includes at least periodically interrogating the stored products with the scanner such that the scanner causes the smart tags to emit their product identification signal. These received signals are processed and, for each identified product, the respective product profile of that product is used to determine if any of the other identified products are of the type that should not be stored in close proximity to the identified product, or combined with the identified product.

If it is determined that there is an improper storage of the products, the system may emit any suitable alarm or alert so that a technician or other person may rectify the problem. Desirably the alarm or alert may also specifically identify the particular offending products.

The scanner may function to interrogate the stored products in various ways. For example, the scanner may continuously scan the products, or periodically interrogate the stored products according to a predetermined schedule.

An additional smart tag scanner may be disposed at an entrance to the storage location to scan the products as they are put into the location. In certain situations, the entrance scanner may also serve to function as the storage location scanner, depending on the size and physical characteristics of the storage location. The entrance scanner scans any additional products that are put into the location and emits an alert or alarm if a product scanned at the entrance is one of the types of products that should not be stored in the storage location.

In an alternate embodiment, the storage location is subdivided into a plurality of sub-locations. This may be a typical configuration in larger types of storage locations, such as warehouses, storage rooms, etc. Each sub-location has at least one scanner assigned thereto. The sub-locations are located so that their respective scanners have an effective range so as to receive product information signals from the products stored at the positions within their associated sub-location. In other words, the scanners in one sub-location do not interfere with the scanners in adjacent or nearby sub-locations. Each sub-location and associated scanner essentially acts as an independent storage location, as discussed above. With this embodiment, an additional scanner may be disposed at the entrance to the location. The additional scanner scans products prior to placement of the product into any sub-location and identifies the particular sub-location that the scanned product is to be stored in. The entrance scanner may also issue an alert if there are any particular sub-locations that the product should not be stored in.

It should be appreciated that the system according to the invention may be configured with any conventional computer hardware/software architecture configuration for carrying out any of the desired functions. For example, the RFID scanners may be interfaced with a computer for the purpose of carrying out the comparison of scanned products versus product profiles, issuing alerts, updating the product profiles, etc.

In still an alternate embodiment, a RFID method according to the invention is provided for minimizing inadvertent mixing or combination of products. There are many instances wherein products or substances are relatively stable in a base condition, but become extremely volatile and dangerous if mixed or combined with other substances, even minute amounts of substances. The RFID methodology according to the invention may help in preventing inadvertent mixture or combination of such dangerous substances. The method includes associating RFID smart tags with any products at a location wherein mixing or combining of products is anticipated. Such locations may be, for example, laboratory environments, medical research facilities, industrial facilities, etc. The smart tags contain information to identify the product it is associated with. A product profile is compiled and stored for any of the products at the mixing or combining location that may potentially be mixed or combined together. The product profile includes information on other products, materials, and substances that should not be mixed or combined with the respective product, or should only be mixed or combined under extreme caution.

A smart tag scanner is disposed at a location so as to be within range of the smart tags of any products to be mixed or combined. For example, the mixing or combining may take place at a workstation, protective room, under a hood, etc. The smart tag scanner may be disposed adjacent to such location so as to be able to interrogate any products brought to the mixing location. The smart tag scanner is configured to retrieve the product identification information from the smart tags prior to any mixing or combining of the products. For the products identified by the scanner, the respective product profiles are analyzed to determine if the proposed combination of products to be mixed or combined is safe or otherwise proper. If the proposed combination of products is improper, or satisfies other alert criteria, then an alarm alert is issued.

The scanner at the mixing location may interrogate for products at the location on a continuous or intermittent basis.

A user of equipment or materials can also be identified with RFID technology via scanning a smart tag associated with the user, and personal information can be retrieved about the training and authorization of the user to ensure that only properly trained or authorized individuals handle certain items or execute certain tasks involving potential safety hazards. The system can also document and archive information about materials usage and users of materials using RFID technology as part of the documentation process.

Additional aspects of the present methodology and system will be described below with reference to the figures.

DETAILED DESCRIPTION

Figure 1:
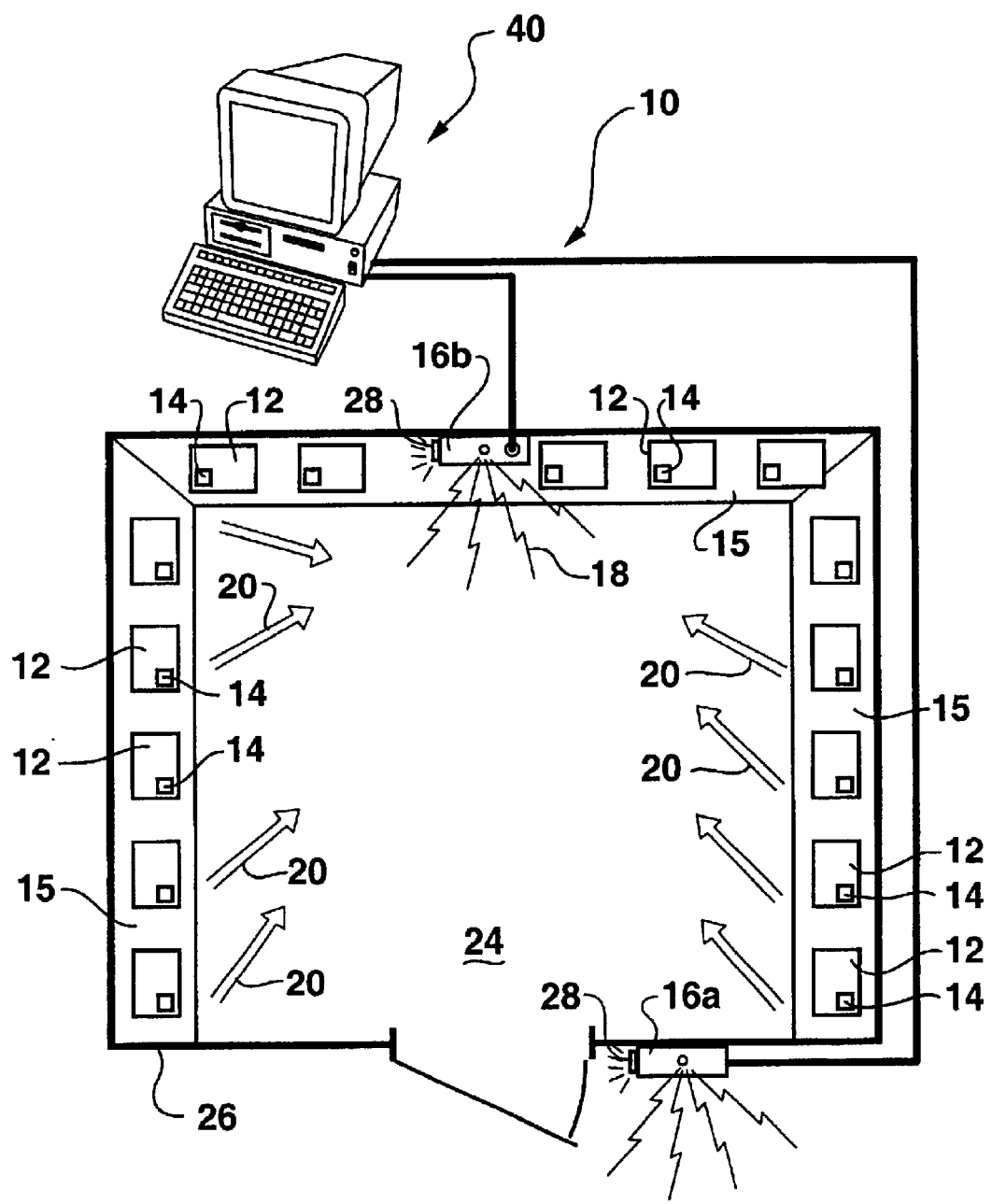
FIG. 1 is a graphic illustration of concepts according to the invention.

Reference will now be made in detail to one or more embodiments of the invention, examples of which are graphically illustrated in the drawings. Each example and embodiment are provided by way of explanation of the invention, and not meant as a limitation of the invention. For example, features illustrated or described as part of one embodiment may be utilized with another embodiment to yield still a further embodiment. It is intended that the present invention include these and other modifications and variations.

FIG. 1 graphically illustrates conceptual aspects of a method and system 10 according to the invention. The method and system 10 may be useful in any environment wherein products 12 are stored in a defined structure 26 for a period of time. The location 26 is not limited by structure, size, physical location, etc., but encompasses any physically defined location wherein products are stored. The structure 26 is illustrated generally in FIG. 1 as a storage "room" defining an internal storage location 24 having a plurality of storage positions 15 provided therein. The positions 15 may be, for example, positions on a shelf, in a container, in a locker, in a cabinet, etc.

It should also be appreciated, that the particular type of products 12 is not a limiting feature of the invention. The invention has particular usefulness wherein products 12 are of the type such that caution should be taken when storing the products. As discussed, such products may be, for example, toxic or hazardous chemicals, biological samples, volatile substances, etc., wherein care should be taken as to the types of products or materials that are stored next to the products 12 or in the same storage location.

It should be recognized that the embodiment of FIG. 1 is conceptual in nature, and is meant to convey basic concepts of the invention, for example, a storage location wherein any type of products are stored in relative close proximity to other products. Such a scenario is typical in many fields. It should be appreciated that the methodology according to the present invention is applicable to all such fields.

Each of the products 12 stored within the storage location 24 is "associated" with a smart tag 14. The smart tags 14 are RFID devices that transmit a pulse of coded product identifying information 20 in response to an electronic trigger signal 18 from a scanner 16. The scanners 16 include an antennae 22 for transmitting the trigger signal 18 and receiving the product identification signal 20. The smart tags 14 may be attached, adhered, or otherwise associated with the respective products 12 by any suitable means, including adhesives, mechanical fasteners, and the like. In particular embodiments, the smart tags 14 may be embedded in or otherwise permanently affixed to containers in which substances are stored. Alternatively, the smart tags 14 may be incorporated with the packaging of certain types of products. The smart tags 14 may be incorporated directly into the products. It should be appreciated that the smart tags 14 may be "associated" with the products in any number of ways.

At least one smart tag scanner 16b is disposed at the storage location 24. The smart tag scanner 16b is disposed so as to be within range of all of the product positions 15 within the storage location 24. For example, the scanner 16b may be centrally located within the storage location 24, for example mounted to the ceiling, the floor, etc. The location of the scanner 16b within the storage location 24 is not critical, so long as the scanner 16b is within range of all of the product positions 15 within the location.

The scanner 16b (or an entrance scanner 16a) continuously or intermittently interrogates the products stored within the location 24 by emitting a trigger excitation signal received by any smart tags 14 within the location 24. With conventional RFID "smart systems" the smart tags 14 are passive devices and the scanner 16 emits the trigger excitation signal 18 which is received by an internal antennae in the smart tags 14. The signal 18 causes the smart tags 14 to generate and transmit an electromagnetic pulse containing the coded product identification information signal 20. The coded signal 20 is received by the scanner antennae 22 and decoded into useful information regarding the identification of the scanned products. The product identification information stored by the smart tags 14 may be any type of information useful in identifying the product. For example, the information may give the manufacturer's name, product name, generic product type, product components or ingredients, and so forth. Generally, the information contained by the smart tag may be any type of information considered useful for properly storing the products in a safe manner.

An embodiment of the methodology and system according to the invention involves compiling and storing product profiles for each type of product 12 stored within the location 24, or which may be brought into storage within the location 24. The product profile includes information on materials, substances, other products, that may cause concern or alert if stored with or in close proximity to the products 12. The product profile should also include information for any products, substances, or materials that should not be combined with any product 12 or, if combined, should only be done with extreme caution. Referring to FIG. 1, the product profiles may be stored within any conventional computer hardware/software architecture interfaced with the scanners 16a and 16b. By way of an interfaced computer system 40, the product profiles may be updated, evaluated, deleted, etc. The computer system 40 also provides a means for visually displaying the results of a product scan, any alert conditions, and the like.

A verification or accountability step according to an embodiment of the method involves using the respective product profiles to determine if any of the products identified by the scanner within the storage location 24 are improperly stored relative to any other identified product. For example, the product profiles may indicate that two of the products within the location 24 should not be stored in the same location, or should be stored at least a certain distance from each other. Criteria are established as to when an alarm or alert is issued by the system prompting corrective action. For example, if the product profiles indicate that a product should not be stored within the location 24 at all because of the presence of another product, then an alarm or alert may be issued via the computer 40 or an alarm 28 interfaced directly with the scanners 16a and 16b, or provided by another source, such as a loudspeaker, flashing lights, a remote video monitor, and the like. In one embodiment, the alarm 28 generates narrow "hypersonic" beams of sound directed to one or more individuals such that others do not hear the message. Hypersonics sound technology, such as that provided by American Technology (San Diego, Calif.), is described in a white paper entitled, "Theory, History, and the Advancement of Parametric Loudspeakers: A Technology Overview," by James J. Croft and Joseph O. Norris, Revision D, American Technology Corporation, San Diego, Calif., 2002, available at http://www.atcsd.com/pdf/HSSWHTPAPERRevD.pdf. Exemplary applications of hypersonic technology are illustrated at www.popsci.com/popsci/hometech/article/0,12543,351353,00.html.

Criteria (rules) may be established for issuing cautions wherein products can be stored within the same location, but only under certain procedural safeguards. These cautions may then be acted on or verified by personnel.

As mentioned, the scanners 16*a*, 16*b* may interrogate the stored products 12 on a continuous basis. In an alternate embodiment, the scanners interrogate the products on an intermittent or periodic basis according to a defined schedule. Alternatively, the interrogations may be triggered by an event, such as an opening or closing of a door to the storage location, or the turning on or off of a light within the location, or any other event indicative of a product being entered into or taken from the storage location 24.

The scanner 16*a* may be disposed at the entrance to the storage location 24 so as to interrogate any product intended to be brought into the location 24. The scanner 16*a* is interfaced with the computer system 40 and conducts an initial verification as to whether the product to be brought into the location 24 is proper, or should not be allowed into the location at all. The scanner 16*a* may also function as the internal location scanner 16*b*, as describe above, provided that the scanner is within range of all of the storage positions 15 within the location.

RFID smart tag technology is known and understood by those skilled in the art, and a detailed explanation thereof is not necessary for purposes of describing the method and system according to the present invention. Generally, conductive or passive smart tags 14 consist of silicon or other semiconductors, a coiled, etched, or stamped antennae, a capacitor, and a substrate on which the components are mounted or embedded. A protective covering is typically used to encapsulate and seal the substrate. Inductive or passive smart tags have been introduced by Motorola under the name "BiStatix". A detailed description of the BiStatix device may be found in U.S. Pat. No. 6,259,367 B1, incorporated herein by reference in its entirety for all purposes. Another commercial source of suitable smart tags is Alien Technology Corporation of Morgan Hill, Calif., under the technology name FSA (Fluidic Self-Assembly). With the FSA process, tiny semiconductor devices are assembled into rolls of flexible plastic. The resulting "smart" substrate can be attached or embedded in a variety of surfaces. The smart tag technology under development at the Auto-ID Center at Massachusetts Institute of Technology (Cambridge, Mass.) can also be used within the scope of the present invention. Further information on smart tags and related technology is disclosed in U.S. Pat. No. 6,451,154, "RFID Manufacturing Concepts," issued Sep. 17, 2002 to Grabau et al.; U.S. Pat. No. 6,354,493, "System and Method for Finding a Specific RFID Tagged Article Located in a Plurality of RFID Tagged Articles," issued Mar. 12, 2002 to Mon; PCT publication WO 02/48955, published Jun. 20, 2002; U.S. Pat. No. 6,362,738, "Reader for Use in a Radio Frequency Identification System and Method," issued Mar. 26, 2002 to Vega; D. McFarlane, "Auto-ID Based Control," White Paper for the Auto-ID Centre Institute for Manufacturing, University of Cambridge, Cambridge, United Kingdom, Feb. 1, 2002, available at http://www.autoidcenter.org/research/CAM-AUTOID-WH-004.pdf; and Chien Yaw Wong, "Integration of Auto-ID Tagging System with Holonic Manufacturing Systems," White Paper for the Auto-ID Centre Institute for Manufacturing, University of Cambridge, Cambridge, United Kingdom, September 2001, available at www.autoidcenter.org/research/CAM-WH-001.pdf.

Other RFID technologies believed to be of value for the present invention include those produced by Microchip Technologies (Chandler, Ariz.), which provides remote read-write chips at several frequencies. Also of potential value are the I*CODE chips and readers of Philips Semiconductor (Eindhoven, The Netherlands), which, in one embodiment, are said to include 384 bit configurable read/write memory with 64 bits for a unique serial number (e.g., an electronic product code). Sokymat (Lausanne, Switzerland) markets the PICCOLO read-only RFID disc tag which transmits data to a reader station by an AM radio signal. The tag is said to have 64 bits of data that can be programmed during manufacturer by laser fusing of polysilicon links in order to store a unique code on each tag.

Texas Instruments (Dallas, Tex.) offers RFID technology as part of Texas Instruments RFID (TI*RFID™) Systems, formerly known as the TIRIS© system (Texas Instruments Registration and Identification System), which is used to track and identify various assets using devices such as the TI Tag It™ chip.

Gemplus (Gemenos, France) provides smart tags (sometimes called "smart labels") and smart cards employing RFID technology, which may be used as smart tags. They also market interfaces, antennas, scanners and software that can be adapted for use with smart tags.

Nedap (Groenlo, The Netherlands) provides smart cards and a 13.56 MHz smart tag using RFID technology with 512 bits of read-write memory with a range of about 120 cm. It is claimed that about 20 such tags per second can be read successfully by a scanner.

Checkpoint Systems Inc. (Miami, Fla.) offers a smart tag with WORM technology (write once, read many). One example is the MCRF355 chip, described more fully at http://www.idsystems.com/reader/1999_05/join0599.htm.

PDA-like reader systems and other portable readers for RFID technology are marketed by Omron Company (Tokyo, Japan), such as the Model V700 or V720 series.

High frequency bands can be used in RFID technology, such as bands between 300 MHz and 10 GHz. SCS Corporation (Rancho Bernardo, Calif.), for example, markets smart tag technology at 2.45 GHz. Ultra-wide band technology can also be adapted for RFID systems.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device. On a chip coupled with an antenna. The SAW device converts a radio signal to an acoustic wave, modulates it with an ID code, then transforms it to another radio signal that is emitted by the smart tag and read by a scanner. The ID code of the smart tag is extracted from the radio signal. The scanner is said to compare the spectral content of the signal with a database of signatures and to derive the ID code. This method enables a read range of up to 30 m (typical 10–20 m). The system can operate in the 915 MHz band and 2.45 GHz band. RFSAW, Inc. (Dallas, Tex.) also provides minute Surface Acoustic Wave (SAW) RFID devices that can be used within the scope of the present invention.

The antennae embedded within the smart tags 14 is generally one component of the device, though it is recognized that alternatives to antennas may exist in some applications. (For example, for some metallic objects, the smart tag need not comprise an antenna but the metallic object itself can serve as the antenna.)

The antennae embedded within the smart tags 14 may be a useful component of the device, though it is recognized that alternatives to antennas may exist in some applications. (For example, for some metallic objects, the smart tag need not comprise an antenna but the metallic object itself can serve as the antenna.) The excitation signal 18 from the scanner 16 must be received by the antennae to "activate" the smart tag. The received excitation signal 18 is the power source for the smart tag 14 and results in the generation of the electromagnetic pulse containing the coded food product information signal 20. A detailed description of RFID smart tag antennas may be found in U.S. Pat. No. 6,320,556 B1, incorporated herein by reference for all purposes.

In an alternate embodiment, the smart tags 14 may be active devices. In this configuration, the smart tag 14 includes active transceiving circuitry that has the capability to selectively respond to coded request signals transmitted by a scanner 16. The active smart tag 14 may include the capability to receive and store additional information beyond the information contained in its fixed code. An active smart tag 14 requires an internal power supply, such as a micro-battery, thin film battery, or the like.

The product identification signals 20 may include a link or code to a remote database having additional product information. This link or code may enable the scanner 16 to communicate with such database by conventional wireless or wired technology. For example, the scanner 16 may be in communication with the computer system 40, which may be Internet accessible. The signal 20 may include an URL code to launch an Internet browser application. In this way, the scanner 16 or computer 40 may provide personnel or remote individuals with Internet access to websites containing additional information about the product. Alternatively, the scanner 16 may be an internet accessible wireless device. The Internet websites may be maintained, for example, by manufacturers, suppliers, or vendors of the products.

The RFID scanners 16a or 16b may be of conventional hardware and software architecture. The scanners 16 receive the coded product information signal 20, and then decode the signal into usable commands and data. The scanners 16 include a microprocessor and software programs for this purpose. The scanners 16 provide an output that may be in various forms. For example, the scanner 16 may visually display the identified products or any cautions, alarms, or alerts by way of a visual display screen 24. Alternatively, the scanner 16 may include any configuration of visible or audible alarm 28 to automatically alert any individual in the storage location if a potentially unsafe condition exists. The alarms may be sent to remote locations as well.

Figure 2:
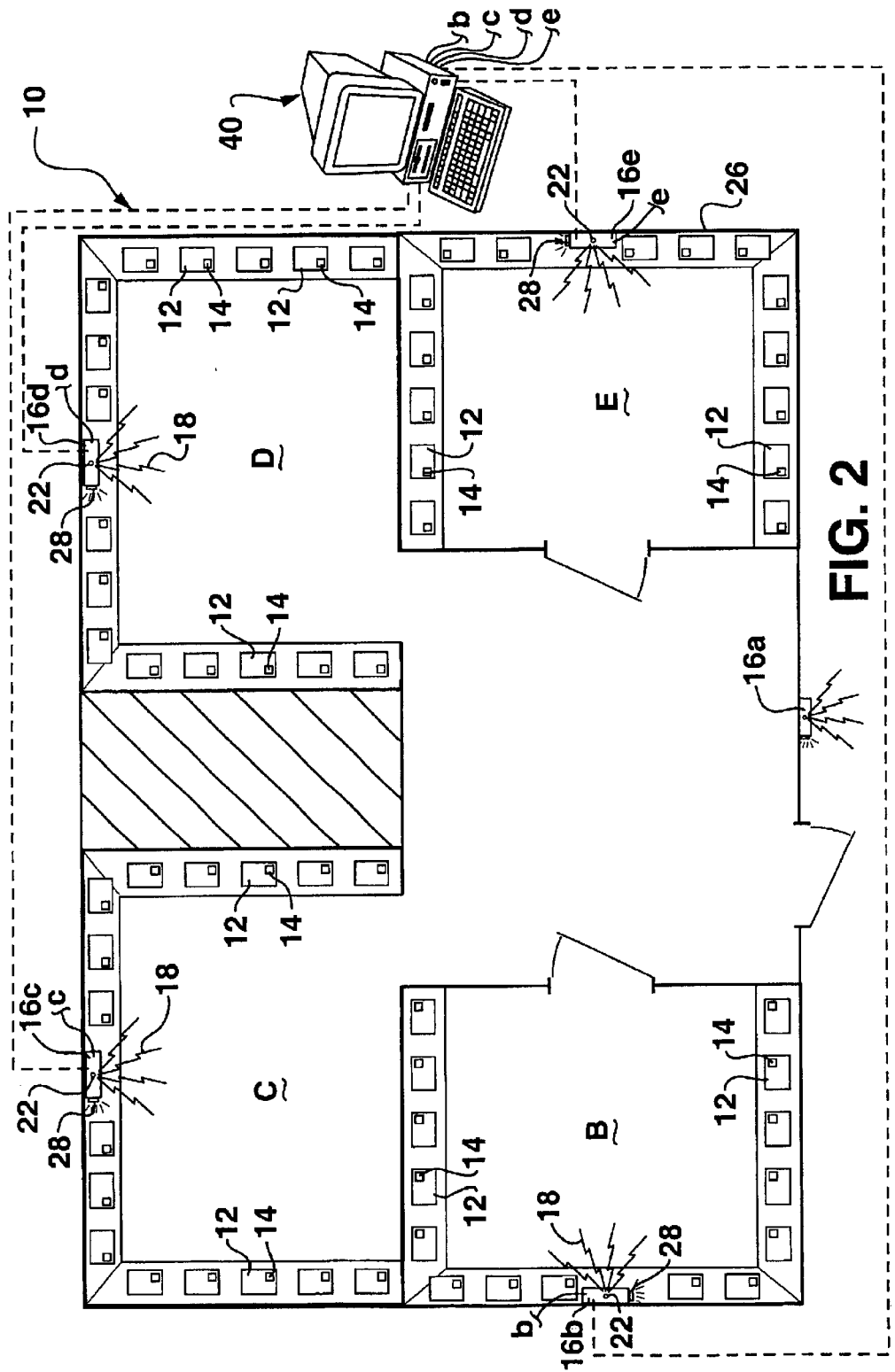
FIG. 2 is a graphic illustration of an alternate method according to the invention.

FIG. 2 is a graphic illustration of an alternate conceptual use of the system and method 10 according to the invention. In this embodiment, the storage location 24 is divided into sub-locations B, C, D, and E. This may be a typical scenario in a warehouse, or any other larger type of storage structure wherein different types of products are stored at different locations within the same structure. Each of the sub-locations B through E is configured essentially as described above with reference to FIG. 1. In other words, each sub-location has its own assigned scanner 16 (scanners 16b, 16c, 16d, 16e) that is located so as to be able to interrogate any product contained at any position 15 within the sub-location. An entrance scanner 16a may be disposed at the entrance to the entire location 24. The entrance scanner 16a may signal if a product about to be brought into the location either should not be brought in at all, or should only be stored in a particular sub-location. For this purpose, the scanner 16a may incorporate a visual display screen at the entrance to the location 24. The plurality of scanners 16a through 16e are in communication with the computer system 40, as described above.

Figure 3:
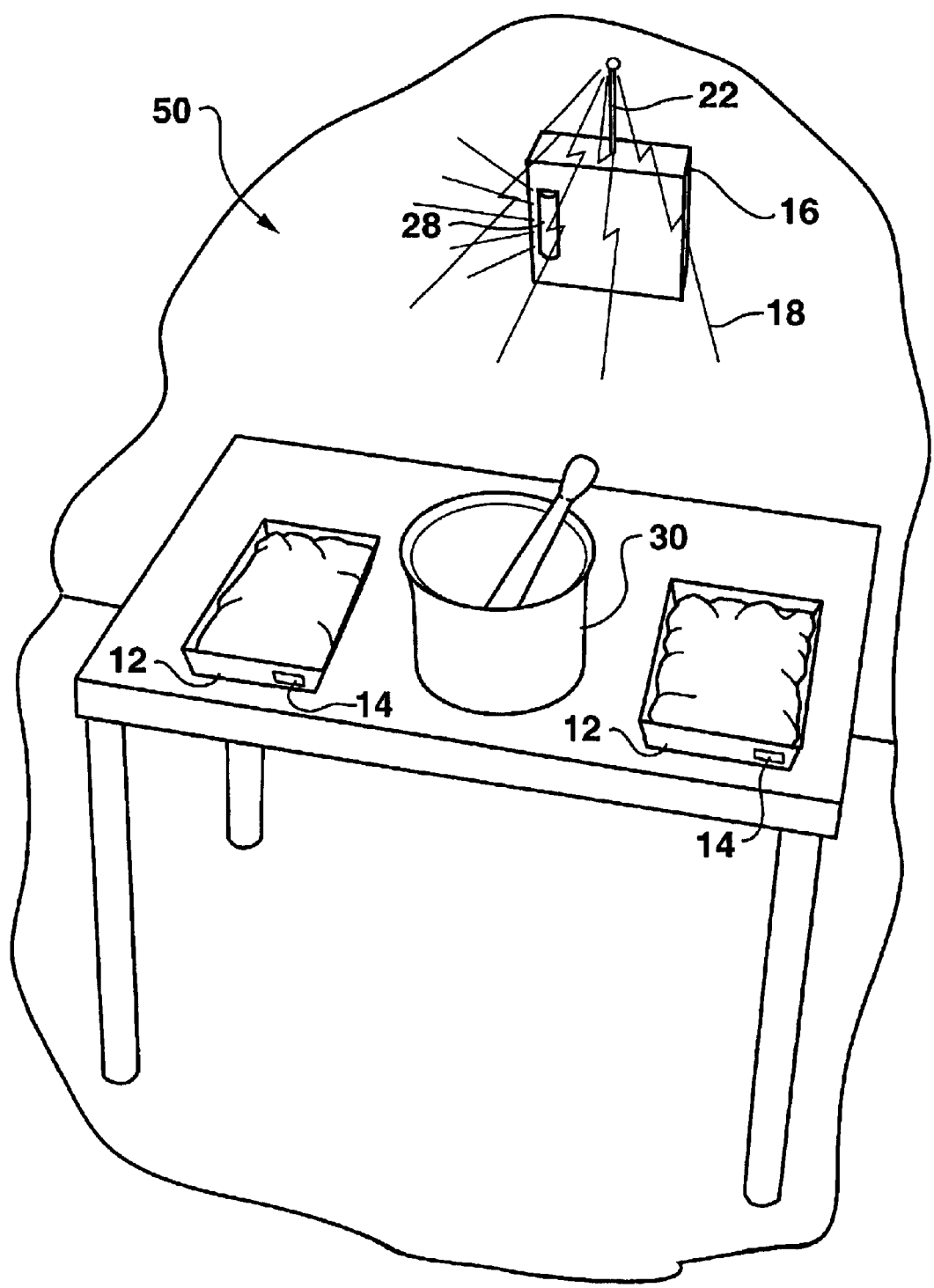
FIG. 3 is a graphic illustration of yet another embodiment of a method according to the invention.

The methodology and system according to the invention may also prove useful in any situation or environment wherein it is desired to prevent inadvertent mixing or combination of particular products. For example, any chemicals or other substances are relatively stable in a base state, but become extremely volatile and dangerous when combined with other products, even minute quantities of such products. The present methodology and system may be used to prevent any inadvertent mixing or combination of products. This idea is conceptually illustrated by FIG. 3 wherein a mixing or combining location 50 has an RFID scanner 16 disposed so as to be within range of any products 12 intended to be combined or mixed. The location 50 may be, for example, a laboratory, work station at a research facility, industrial site, and generally any location wherein potentially hazardous products are brought together to be combined. In the illustrated embodiment, the location 50 is a simple work station or table within a laboratory. The products 12 are intended to be mixed within a mixing pot or chamber 30.

RFID tags 14 are associated with any product brought to the mixing location 50. As described above, the RFID tags contain information relating to the identity of the product it is associated with. A product profile is maintained and stored for any product that may be potentially mixed or combined with another product at the location 50. The product profile includes information on other materials, substances, products, and the like, that should not be mixed or combined with the respective product, or should only be mixed or combined under extreme caution. The smart tag scanner 16 is disposed so that as the products to be combined are brought to the mixing location, the scanner 16 interrogates the products and, based on the received product identification signal, the verification is conducted with the respective product profiles to determine if the proposed combination of products 12 is safe or being done in accordance with proper procedures.

The scanner 16 may include any manner of suitable visual or audible or alarm 28 in the event that an unsafe condition is determined. As described, scanner 16 may be interfaced with a computer system 40 for various other functions. Scanner 16 may continuously monitor or interrogate at the location 50, or only when products 12 are brought to the location.

Figure 4:
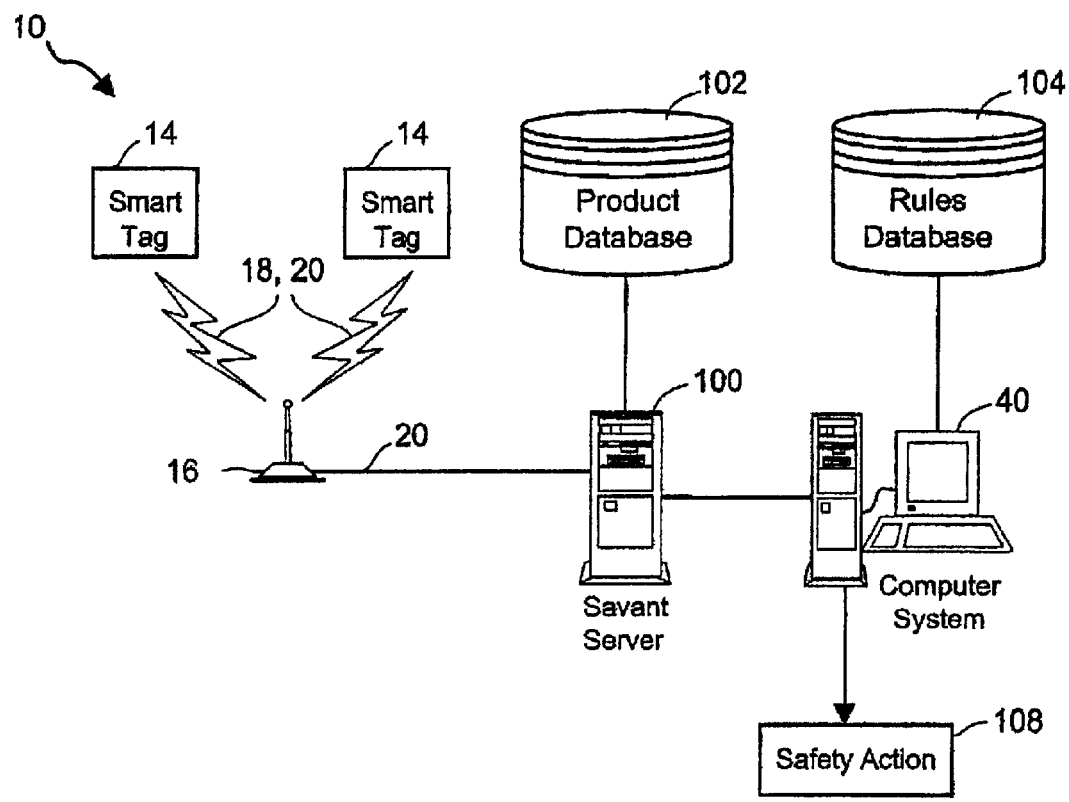
FIG. 4 is a graphic illustration of yet another embodiment of a method according to the invention.

FIG. 4 is a graphic illustration of one configuration of the system and method 10 according to the invention. Two smart tags 14 associated with two items selected from chemicals, materials, or processing equipment (not shown) are read by a scanner 16. Electronic product codes 20 (the product identification signal) obtained by the scanner 16 are transmitted to a savant server 100 which uses the product codes 20 to query a product database 102 and receive detailed product information (MSDS data, chemical reactivity information, toxicity data, pH, and the like). The product information is transmitted to a computer system 40, where a processor queries a rules database to determine if there is unacceptable risk in the combined use of the two items (not shown) associated with the smart tags 14. For example, if one item is acidic and the other item is basic, the rules database may provide information specifying that for the concentrations and chemical involved, mixture of the two compounds may be dangerous unless certain precautions are taken. In another example, one of the two smart tags 14 may be associated with a storage location for acids, and the other smart tag 14 may indicate the product is a flammable hydrocarbon, and rules from the rules database 104 may indicate that a flammable product should not be stored in storage location for acids.

The application of rules from the rules database 104 to the product information from the product database 102 for the products associated with the smart tags 14 results in a proposed safety action 108 generated by the computer system 40. The proposed safety action 108 may be a warning or alarm requiring action by the user such as verifying that a danger has been recognized and will be properly dealt with, or may be activation of an interlock system that prevents activating a device or opening a cabinet until a safety risk has been resolved, and the like. In one embodiment, the safety action may be activation of a video surveillance system to record actions involving potential safety hazards to permit human supervisors to observe the situation, and to record events for future analysis should a problem occur. The safety action 108 may also include remedial actions should items be improperly combined or used, such as removing a user from the list of authorized users of a process, or requiring additional safety training of a user before the user can work in the facility again. The user may be identified through an RFID system as well, based on reading a personal ID code or other identification information from a smart tag associated with the user, and the system 10 may include means (not shown) to ensure that only authorized or properly trained users are allowed to handle certain materials or pieces of equipment. An alarm may be issued of the user in not approved to use the materials or equipment in question.

It should be appreciated by those skilled in the art that the system and method according to the invention have wide applications, and that the example and embodiments set forth herein are merely exemplary. It is intended that the present invention include such uses and embodiments as come within the scope and spirit of the appended claims.

What is claimed is:

1. A RFID method for storing products in a defined location to minimize undesired combinations of stored products resulting from improper placement of the products in the storage location, said method comprising:

providing a storage location having storage positions therein;

associating RFID smart tags with a plurality of products to be stored within the storage location, the smart tags containing information to identify the product they are associated with;

compiling and storing a product profile for the plurality of products to be stored within the storage location, the profile including information on products, materials, and substances that should not be stored together or in close proximity to the profiled product;

disposing a smart tag scanner at a position relative to the storage location such that the scanner is within range of any smart tag associated with a stored product at any position within the storage location, the smart tag scanner configured to retrieve the product identification information from the smart tags; and for the products identified by the scanner, using the respective product profiles to determine if any of the identified products are improperly stored relative to any other identified product.

2. The method as in claim 1, further comprising disposing an additional smart tag scanner at an entrance to the storage location to scan products as they are put into the location, and emitting an alert or alarm if a product scanned at the entrance should not be stored in the storage location.

3. The method as in claim 1, further comprising emitting an alert or alarm in the event that an improper combination of products is determined.

4. The method as in claim 3, further comprising identifying the improper combination of products in the storage location.

5. The method as in claim 1, wherein the scanner periodically interrogates the products in the storage location.

6. The method as in claim 1, wherein the scanner continuously interrogates the products in the storage location.

7. The method as in claim 1, wherein the storage location is sub-divided into a plurality of sub-locations, each sub-location having at least one scanner assigned thereto, the sub-locations being located so that their respective scanners have an effective range so as to receive product information signals from products within their associated sub-location.

8. The method as in claim 7, wherein an additional scanner is disposed at an entrance to the location, the additional scanner scanning products prior to placement in any sub-location and identifying the particular sub-location the scanned product is to be stored in.

9. The method as in claim 8, comprising identifying any products already at any sub-location within the storage location that may conflict with the newly scanned product.

10. The method as in claim 1, wherein the smart tags are passive tags and are associated with disposable product containers.

11. The method as in claim 1, wherein the products are carried in reusable containers, the smart tag for a reusable container being an active tag that can be reprogrammed for different products placed in the container.

12. The method as in claim 1, wherein the products are chemicals.

13. The method as in claim 1, wherein the products are biological samples.

14. The method as in claim 1, wherein the products are volatile in the presence of another product.

15. A RFID method for minimizing inadvertent mixing or combination of products, said method comprising:

associating RFID smart tags with a plurality of products at a mixing or combining location that may potentially be mixed or combined, the smart tags containing information to identify the product it is associated with;

compiling and storing a product profile for the plurality of products that may potentially be mixed or combined, the profile including information on other products, materials, and substances that should not be mixed or combined with the respective product;

disposing a smart tag scanner at a location so as to be within range of the smart tags of any products to be mixed or combined, the smart tag scanner configured to retrieve the product identification information from the smart tags prior to any mixing or combining of the products; and for the products identified by the scanner, using the respective product profiles to determine if the combination of products to be mixed or combined is proper.

16. The method as in claim 15, further comprising emitting an alert or alarm in the event that the products to be combined or mixed is improper.

17. The method as in claim 15, wherein the scanner continuously interrogates for products at the mixing or combining location.

18. The method as in claim 15, wherein the products are chemicals.

19. The method as in claim 15, wherein the products are biological samples.

20. The method as in claim 15, wherein the products comprise radioactive materials.

21. The method as in claim 15, wherein the products are volatile in the presence of another product.

22. The method as in claim 15, wherein using the using the respective product profiles comprises analysis of the product profiles by a computer program which employs a set of rules to determine the compatibility of groupings of two or more of the plurality of the products that may potentially be mixed or combined.

23. The method as in claim 15, further comprising identifying a user of one or more of the plurality of products, and retrieving information about the user to determine if the user has been trained or authorized to use the one or more products, and issuing an alarm if the user in is not trained or authorized to use the one or more products.

* * * * *